US009235518B2

(12) United States Patent
Cantu et al.

(10) Patent No.: US 9,235,518 B2
(45) Date of Patent: *Jan. 12, 2016

(54) SHARED NETWORK RESPONSE CACHE (75) Inventors: Edgar O. Cantu, Round Rock, TX (US); Seth Daniel Jennings, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 808 days.

This patent is subject to a terminal disclaimer.

(21) Appl. No.: 13/474,251

(22) Filed: May 17, 2012

(65) Prior Publication Data

US 2012/0324035 A1    Dec. 20, 2012

Related U.S. Application Data (63) Continuation of application No. 13/162,202, filed on Jun. 16, 2011.

(51) Int. Cl.
*G06F 15/167* (2006.01)
*G06F 12/08* (2006.01)
*H04L 29/08* (2006.01)

(52) U.S. Cl.
CPC .......... *G06F 12/0813* (2013.01); *G06F 12/084* (2013.01); *H04L 67/2842* (2013.01)

(58) Field of Classification Search
CPC ............ H04L 2204/00; H04L 67/2842; G06F 12/0813; G06F 12/084; G06F 15/167
See application file for complete search history.

(56) References Cited

U.S. PATENT DOCUMENTS

| 6,771,649 | B1 * | 8/2004 | Tripunitara et al. ..... 370/395.54 |
| 6,832,252 | B1 | 12/2004 | Cieslak et al. |
| 2002/0013858 | A1 * | 1/2002 | Anderson ...................... 709/245 |
| 2007/0130427 | A1 | 6/2007 | Lahti et al. |
| 2008/0028071 | A1 | 1/2008 | Miyajima |
| 2011/0202731 | A1 | 8/2011 | Ohmacht |
| 2011/0264610 | A1 * | 10/2011 | Armstrong et al. ............. 706/12 |
| 2012/0014387 | A1 | 1/2012 | Dunbar et al. |
| 2012/0195589 | A1 | 8/2012 | Nors |
| 2012/0239811 | A1 | 9/2012 | Kohli et al. |
| 2012/0254543 | A1 | 10/2012 | Sintorn et al. |
| 2012/0257623 | A1 | 10/2012 | Huang et al. |

(Continued)

OTHER PUBLICATIONS

Li Erran Li, Thomas Wo, Vsite: a scalable and secure architecture for seamless L2 enterprise extension in the cloud, The 6th workshop on Secure Network Protocols (NPSec), Oct. 2010, http://www.bell-labs.com.

U.S. Appl. No. 13/162,202, Final Office Action, Sep. 13, 2013.

(Continued)

*Primary Examiner* — June Sison
*Assistant Examiner* — Steven Nguyen
(74) *Attorney, Agent, or Firm* — Kunzler Law Group (57) ABSTRACT

An apparatus and system are disclosed for reducing network traffic using a shared network response cache. A request filter module intercepts a network request to prevent the network request from entering a data network. The network request is sent by a client and is intended for one or more recipients on the data network. A cache check module checks a shared response cache for an entry matching the network request. A local response module sends a local response to the client in response to an entry in the shared response cache matching the network request. The local response satisfies the network request based on information from the matching entry in the shared response cache.

9 Claims, 8 Drawing Sheets

(56) References Cited

U.S. PATENT DOCUMENTS

2012/0311067 A1* 12/2012 Fremantle .................... 709/213
2013/0136126 A1    5/2013 Wang et al.

OTHER PUBLICATIONS

U.S. Appl. No. 13/162,202—Office Action, Dated Oct. 6, 2014.
U.S. Appl. No. 13/162,202, Final Office Action, May 6, 2015.

* cited by examiner

| Shared Response Cache 112 ||
| --- | --- |
| Hardware Address 502 | Protocol Address 504 |
| 00:18:dd:01:6e:b1 | 192.168.0.1 |
| 00:1f:33:d3:4c:fa | 192.168.0.2 |
| 00:1d:e0:22:73:13 | 192.168.0.83 |
| 01:00:5e:7f:ff:a5 | 192.168.0.106 |
| 00:01:e6:4f:32:33 | 192.168.0.107 |

SHARED NETWORK RESPONSE CACHE

This is a continuation application of and claims priority to U.S. patent application Ser. No. 13/162,202 entitled "SHARED NETWORK RESPONSE CACHE" and filed on Jun. 16, 2011 for Edgar O. Cantu, which is incorporated herein by reference.

FIELD

The subject matter disclosed herein relates to network requests and responses and more particularly relates to reducing network traffic from duplicate network requests.

BACKGROUND

Description of the Related Art

As more and more devices are network enabled, the amount of traffic on data networks is increasing. Further, virtualization technology allows hundreds or thousands of virtual network devices to exist on a single network device, each generating its own network traffic.

On data networks with many network devices, especially networks with several virtual network devices, some of the data traffic may be duplicate and unnecessary. Certain network requests may be duplicated by different network devices and these duplicate network requests may even be sent at nearly the same time, as a computer device hosting several virtual machines is booted up, or the like.

Duplicate network requests increase the traffic on a data network and, especially when sent in bursts, can degrade performance of the data network. Additionally, the duplicate network requests increase the processing overhead for recipients that receive the duplicate network requests. Many network requests are broadcast requests, further increasing the data network traffic and the overhead for recipients of the broadcast network requests.

BRIEF SUMMARY

From the foregoing discussion, it should be apparent that a need exists for an apparatus, system, and method that reduce network traffic from duplicate network requests. Beneficially, such an apparatus, system, and method would satisfy network requests with little or no duplication of network requests.

The present invention has been developed in response to the present state of the art, and in particular, in response to the problems and needs in the art that have not yet been fully solved by currently available data network systems. Accordingly, the present invention has been developed to provide an apparatus, system, and method for reducing network traffic that overcome many or all of the above-discussed shortcomings in the art.

A method of the present invention is presented. In one embodiment, the method includes intercepting a network request to prevent the network request from entering a data network. The network request, in certain embodiments, is sent by a client and intended for one or more recipients on the data network. The method, in a further embodiment, includes checking a shared response cache for an entry matching the network request. In another embodiment, the method includes sending a local response to the client in response to an entry in the shared response cache matching the network request. The local response, in certain embodiments, satisfies the network request based on information from the matching entry in the shared response cache.

An apparatus is provided with a plurality of modules configured to functionally execute the steps described above with regard to the presented method. These modules, in the described embodiments, include a request filter module, a cache check module, and a local response module.

In one embodiment, the request filter module intercepts a network request to prevent the network request from entering a data network. The network request, in one embodiment, is sent by a client and intended for one or more recipients on the data network. The cache check module, in a further embodiment, checks a shared response cache for an entry matching the network request. The local response module, in another embodiment, sends a local response to the client in response to an entry in the shared response cache matching the network request. The local response, in one embodiment, satisfies the network request based on information from the matching entry in the shared response cache.

A system of the present invention is also presented. The system may be embodied by a client and a response cache module in communication with the client. In particular, the response cache module, in one embodiment, is substantially similar to the apparatus described above, and includes a request filter module, a cache check module, and a local response module.

Another method of the present invention is also presented. The method in the disclosed embodiments includes providing a response cache module to reduce traffic on a data network. The response cache module, in certain embodiments, is capable of performing the steps of the method described above.

A further method of the present invention is also presented. The method, in one embodiment, includes intercepting an address resolution request to prevent the address resolution request from entering a data network. The address resolution request, in a further embodiment, is sent by a virtual machine of a plurality of virtual machines executing on a computer device connected to the data network. The address resolution request, in another embodiment, is intended for a plurality of recipients on the data network;

In one embodiment, the method includes checking a shared address resolution cache for an entry matching the address resolution request. Entries of the shared address resolution cache, in certain embodiments, are based on previous address resolution responses to previous network requests from the plurality of virtual machines.

The method, in another embodiment, includes sending, exclusive of the data network, a local response to the virtual machine in response to an entry in the shared address resolution cache matching the address resolution request. In one embodiment, the local response satisfies the address resolution request based on information from the matching entry in the shared address resolution cache.

In a further embodiment, the method includes bridging the address resolution request to the one or more recipients in response to the shared address resolution cache failing to have an entry matching the address resolution request. The method, in another embodiment, includes observing an address resolution response to the address resolution request sent from one of the one or more recipients to the virtual machine. In one embodiment, the method includes populating the shared address resolution cache with an entry matching the address resolution request based on information from the observed address resolution response.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1A:
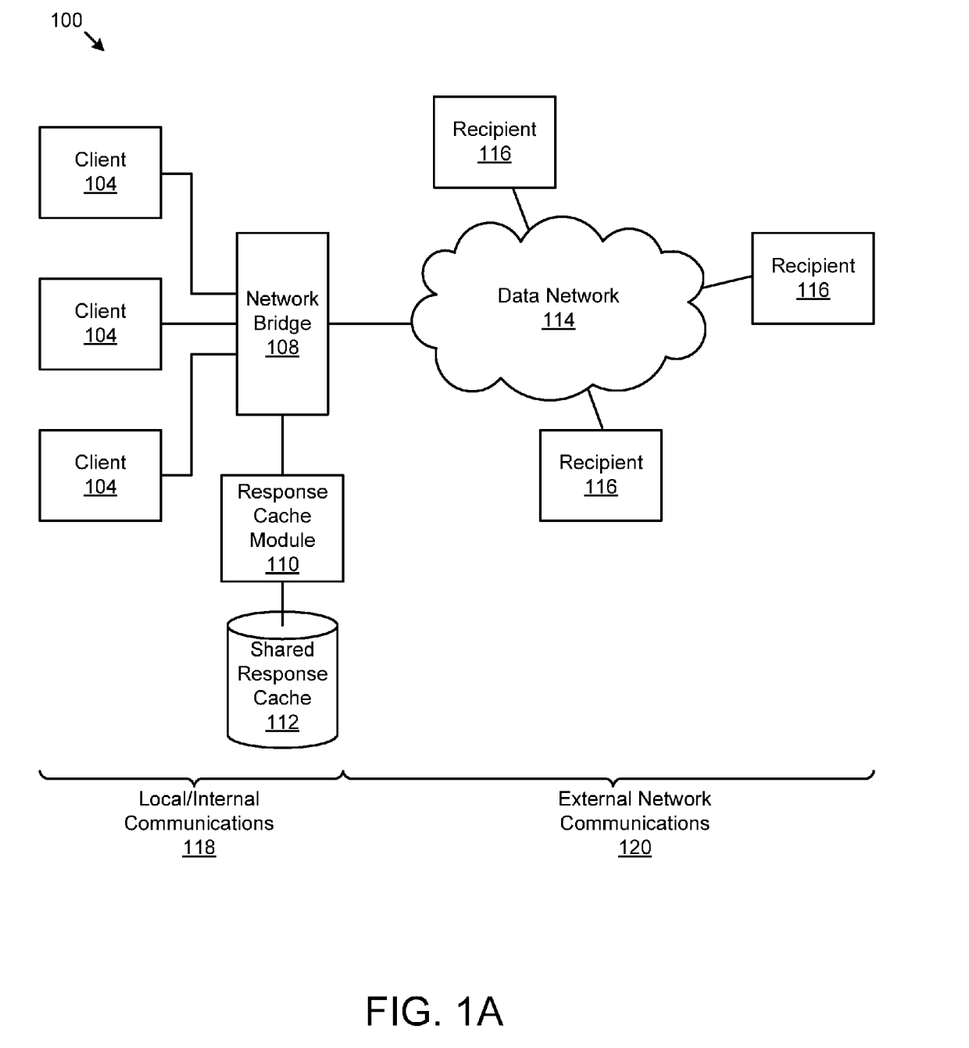
FIG. 1A is a schematic block diagram illustrating one embodiment of a system for reducing network traffic in accordance with the present invention.

FIG. 1A depicts one embodiment of a system 100 for reducing network traffic. In the depicted embodiment, the system 100 includes several clients 104, a network bridge 108, a response cache module 110, a shared response cache 112, a data network 114, and several recipients 116. In the depicted embodiment, local and/or internal communications 118 occur between the client 104 and the network bridge 108 and external network communications 120 occur over the data network 114.

The system 100 reduces traffic on the data network 114 by preventing certain requests from the clients 104 from entering the data network 114, and instead responding to the requests based on data stored in a shared response cache 112. For example, in certain embodiments, the response cache module 110 monitors communications, such as network requests, from the clients 104 at the network bridge 108 or at another location between the clients 104 and the data network 114. The response cache module 110, in the example embodiment, prevents a network request from a client 104 from entering the data network 114 if the shared response cache 112 stores data satisfying the network request. Based on data in the shared response cache 112, the response cache module 110 sends a local response for a blocked network request to the client 104 that sent the request, so that the network request remains a local and/or internal communication 118 without entering the data network 114.

Figure 1B:
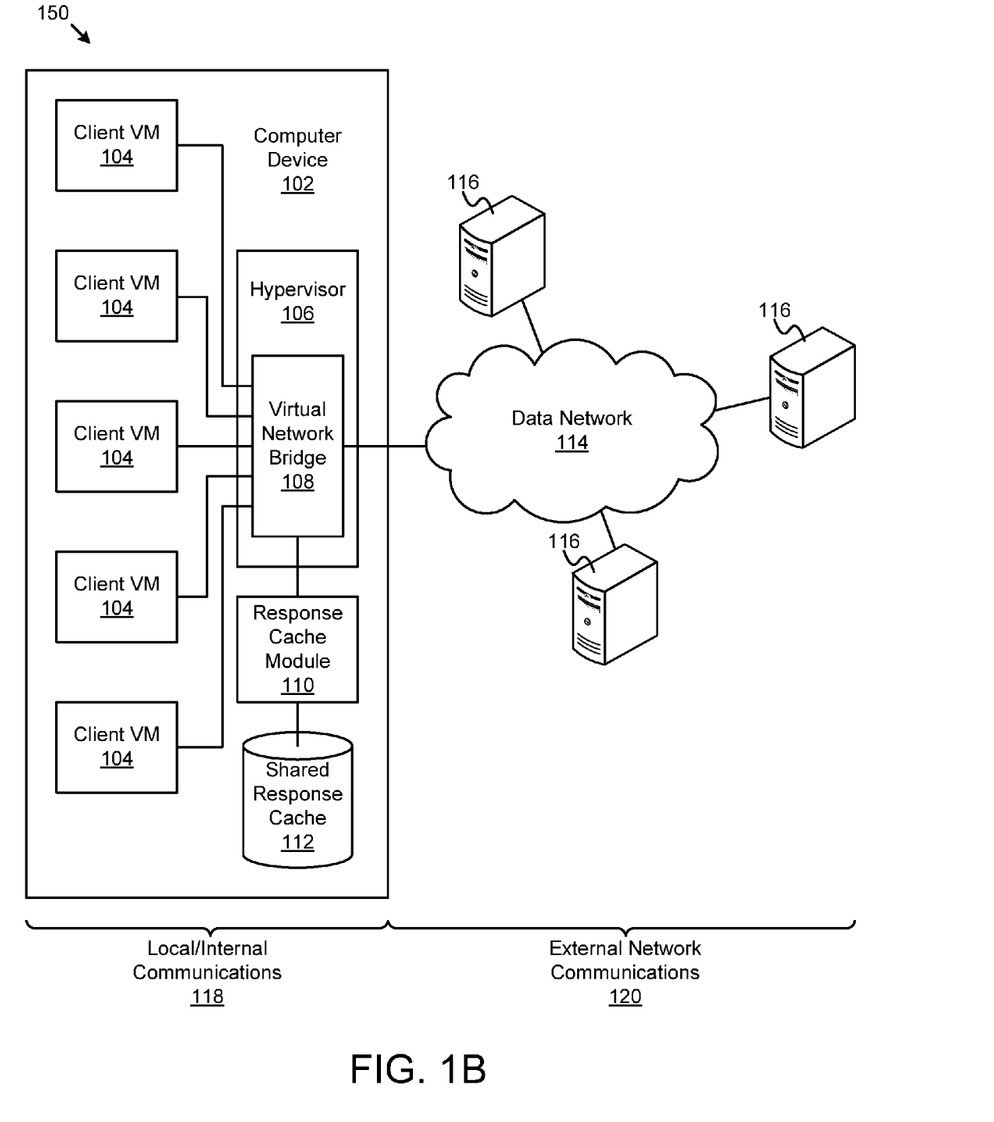
FIG. 1B is a schematic block diagram illustrating another embodiment of a system for reducing network traffic in accordance with the present invention.

Another embodiment where the local and/or internal communications 118 are within a computer device 102 is depicted in FIG. 1B. FIG. 1B depicts another embodiment of a system 150 for reducing network traffic. The system 150 of FIG. 1B is substantially similar to the system 100 of FIG. 1A, but the system 150 includes several clients 104 that are virtual machines executing on a computer device 102, the network bridge 108 is a virtual network bridge 108 that is integrated with a hypervisor 106, and the recipients 116 are each computer devices communicating on the data network 114.

A client 104 is a network entity capable of communicating with other network entities, such as the network bridge 108, the recipients 116, or the like. In certain embodiments, a client 104 may include a hardware network device, such as a server or other computer device, an embedded system, a network attached storage ("NAS") device, or another hardware-based network device. In other embodiments, a client 104 may include a virtual network client, such as the virtual machine clients 104 depicted in FIG. 1B, that executes on a hardware network device such as the computer device 102 depicted in FIG. 1B and shares networking hardware of the hardware network device on which it executes.

The clients 104, in one embodiment, send network requests and/or other network communications intended for one or more recipients 116 on the data network 114 to the network bridge 108. The network bridge 108 routes communications to and from the clients 104, bridging local and/or internal communications 118 and external network communications 120. In certain embodiments, the network bridge 108 includes a hardware bridge device, such as a router, a switch, or the like, with which the clients 104 are coupled. In other embodiments, the network bridge 108 may be virtual, such as the virtual network bridge 109 depicted in FIG. 1B. A virtual network bridge 108 may be installed on a computer device 102 as depicted in FIG. 1B, may be integrated with a network adapter of a computer device 102, may be integrated with a router, switch, or other device between the clients 104 and the data network 114, or the like. One example of a virtual network bridge 108 is a virtual Ethernet bridge ("VEB").

In the system 150 of FIG. 1B, the virtual network bridge 108 is depicted as being integrated with a hypervisor 106. The hypervisor 106 manages the virtual machine clients 104. A hypervisor 106 allows an operating system of each virtual machine client 104 to execute on hardware of the computer device 102, sharing the same hardware. In one embodiment, the hypervisor 106 provides virtual hardware interfaces, such as the virtual network bridge 108, to the virtual machine clients 104 and the virtual machine clients 104 execute using the virtual hardware interfaces. The hypervisor 106 may be integrated with hardware of the computer device 102, may be part of an operating system of the computer device 102, may be a standalone software application executing on the computer device 102, may be a combination of the above, or the like.

The computer device 102 may be embodied by a server computer, a desktop computer, a laptop computer, a tablet computer, a mobile device, a set top box, or another device that includes a processor and a memory. In certain embodiments, for example where the computer device 102 is a server computer device or the like, the computer device 102 may include many virtual machine clients 104, such as tens, hundreds, thousands or another number of separate virtual machine clients 104.

In one embodiment, the response cache module 110 is integrated with the network bridge 108 or is otherwise in communication with the network bridge 108. The response cache module 110 intercepts certain network requests from the clients 104 to prevent the network requests from entering the data network 114. Upon intercepting a network request, the response cache module 110 checks the shared response cache 112 for an entry matching the intercepted network request. The response cache module 110, in certain embodiments, maintains the shared response cache 112 with entries matching previously observed network requests and/or responses that may be used to satisfy subsequent network requests.

If the response cache module 110 finds a matching entry for an intercepted network request in the shared response cache 112, in one embodiment, the response cache module 110 sends a response as a local and/or internal communication 118 to the requesting client 104 based on the matching entry. The local response from the response cache module 110 satisfies the intercepted request without bridging the intercepted request to the data network 114. If the response cache module 110 fails to find a matching entry for an intercepted network request, in one embodiment, the response cache module 110 bridges the intercepted network request to the data network 114 and observes a response to the request from a recipient 116 to populate the shared response cache 112 with a matching entry.

The response cache module 110 populates the shared response cache 112 with information relating to observed network responses. The shared response cache 112, in one embodiment, is stored on one or more computer readable storage media. The shared response cache 112, in various embodiments, may include a table, a linked-list, an array, a database, a file, a look-up-table, and/or one or more other data structures with entries populated with data from intercepted communications, such as responses from the recipients 116 and/or requests from the clients 104.

In one embodiment, the response cache module 110 shares the shared response cache 112 with several different clients 104, such as the virtual machine clients 104 depicted in FIG. 1B, or the like. The clients 104 may access the shared response cache 112 directly, the network bridge 108 may provide the clients 104 with access to data from the shared response cache 112, the response cache module 110 may provide the clients 104 with access to data from the shared response cache 112, or the like.

One embodiment of a network request from a client 104 that the response cache module 110 may intercept is a broadcast or multicast request, such as an address resolution protocol ("ARP") request, a neighbor discovery protocol ("NDP") request, or the like, that a client 104 sends to the network bridge 108, intending the request for multiple recipients 116 on the data network 114. For example, a client 104 may send a broadcast request to a broadcast address, such as an Internet Protocol ("IP") address of 255.255.255.255, a broadcast address for a specific IP subnet, a media access control ("MAC") address of FF:FF:FF:FF:FF:FF, or the like.

In certain embodiments, several clients 104 may send similar requests at substantially the same time. For example, in embodiments where the clients 104 include one or more virtual machine clients 104, as depicted in FIG. 1B, upon booting up or in response to another event, the clients 104 may each send similar requests, such as ARP requests, NDP requests, or the like. These substantially simultaneous requests, especially broadcast requests, could cause a significant amount of traffic on the data network 114 and overhead for the recipients 116 if the response cache module 110 did not intercept and respond to at least a portion of the requests.

ARP requests and certain NDP requests are address resolution requests that a client 104 broadcasts to determine a MAC address of a recipient 116 when the client 104 knows an IP address of the recipient 116 but does not know the MAC address. A MAC address is a link layer or hardware address and an IP address is an Internet layer or network layer address. In embodiments where the response cache module 110 intercepts ARP requests, the shared response cache 112 may include an ARP cache, an NDP cache, or another type of address resolution cache, with hardware MAC addresses and corresponding IP addresses stored as entries. One example embodiment of a shared response cache 112 that includes an address resolution cache is described in greater detail below with regard to FIG. 5.

In one embodiment, the data network 114 places the network bridge 108 in digital communication with the recipients 116 and/or with other network devices. The data network 114, in various embodiments, may include a LAN, a WAN, a virtual private network ("VPN"), or the like. The data network 114 may include various connections technologies, such as Ethernet, optical fiber, wireless technology, or the like. In one embodiment, the recipients 116 are each network devices capable of communicating over the data network 114, such as computer devices and/or other devices with network adapters.

In one embodiment, a service provider, a network administrator, a user, or the like, provides a response cache module 110 to a computer device 102 and/or a data network 114 to reduce traffic on the data network 114. For example, a service provider, a network administrator, a user, or the like may install computer executable code of a response cache module 110 on a computer device 102 and/or on a network device of the data network 114, may install hardware and/or firmware of a response cache module 110 on a computer device 102 and/or on a network device of the data network 114, or the like.

Figure 2:
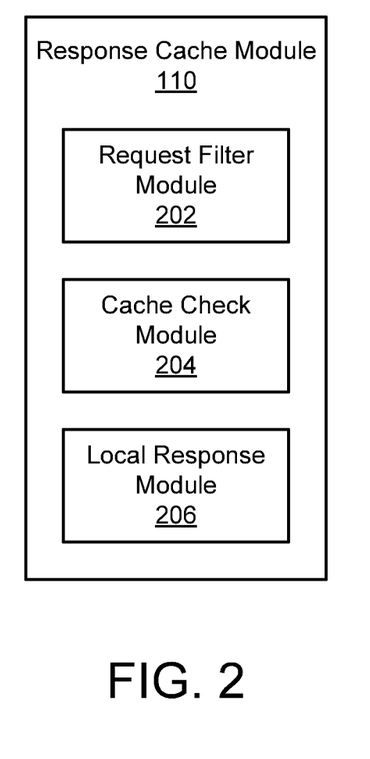
FIG. 2 is a schematic block diagram illustrating one embodiment of a response cache module in accordance with the present invention.

FIG. 2 depicts one embodiment of the response cache module 110. In the depicted embodiment, the response cache module 110 includes a request filter module 202, a cache check module 204, and a local response module 206. The response cache module 110 of FIG. 2, in certain embodiments, is substantially similar to the response cache module 110 described above with regard to FIGS. 1A and 1B.

In one embodiment, the request filter module 202 intercepts network requests from one or more clients 104. A client 104, in certain embodiments, sends a network request to a network bridge 108, intending the network request for one or more recipients 116 on a data network 114, and the request filter module 202 intercepts the network request at the network bridge 108. The request filter module 202, in one embodiment, prevents intercepted network requests from entering the data network 114.

The request filter module 202, in various embodiments, may intercept all network requests, may intercept network requests from a predefined set of clients 104, may intercept one or more predefined types of network requests, may intercept broadcast requests or other multicast requests, and/or may intercept network requests based on other parameters. For example, in one embodiment, the request filter module 202 intercepts address resolution requests, such as ARP requests, NDP requests, or the like.

In one embodiment, the request filter module 202 scans network requests that the network bridge 108 receives, filtering the network requests for one or more predefined parameters. The request filter module 202, in a further embodiment, may inspect a data packet of a network request to determine whether the data packet matches the one or more predefined parameters. For example, the request filter module 202 may inspect a data packet of a network request to determine whether the network request is an ARP request, an NDP request, or the like.

In one embodiment, in response to the request filter module 202 intercepting a network request, the cache check module 204 checks a shared response cache 112 for an entry matching the intercepted network request. An entry matches a network request, in certain embodiments, if the entry includes identifying information of the network request, includes data associated with the network request, or the like. Entries in the shared response cache 112, in one embodiment, are based on previously observed network responses to previous network requests.

The cache check module 204 may use the identifying information or other data associated with a network request as a key for the shared response cache 112 to determine whether the shared response cache 112 includes an entry matching the network request. For example, in an embodiment where the request filter module 202 intercepts ARP requests, NDP requests, or other address resolution requests, an entry in the shared response cache 112 may match an intercepted request if the entry includes an address, such as an IP address, which a client 104 sent the intercepted request to resolve. The shared response cache 112, in certain embodiments, includes an ARP cache with IP addresses and associated MAC addresses, and the cache check module 204 extracts an IP address from an intercepted network request and scans, queries, or otherwise determines whether the shared response cache 112 includes an entry for the extracted IP address with a corresponding MAC address.

In one embodiment, the local response module 206 satisfies an intercepted network request by sending a local response to a client 104 that sent the intercepted network request. The local response module 206 sends a local response for an intercepted network request in response to an entry in the shared response cache 112 matching the intercepted network request. The local response module 206, in certain embodiments, creates a response to an intercepted network request using information from a matching entry in the shared response cache 112 for the intercepted network request. For example, if the intercepted request is an ARP request or another address resolution request, in one embodiment, the local response module 206 forms an ARP response or the like with a MAC address from the shared response cache 112 that satisfies the intercepted request.

The local response module 206, in certain embodiments, formats a local response so that the local response appears to a client 104 to be from a matching recipient 116 on the data network 114. The local response module 206 may use information from a matching entry in the shared response cache 112 to determine which recipient 116 matches an intercepted network request and to format a local response that appears to a client 104 to be from the matching recipient 116. In one embodiment, by formatting a local response so that the local response appears to be from a recipient 116 on the data network 114, the local response module 206 non-maliciously spoofs the response to reduce traffic on the data network 114.

The local response module 206, in one embodiment, sends a local response to a requesting client 104 exclusive of the data network 114, sending the local response as a local and/or internal communication 118, so that neither the network request nor the local response enter the data network 114. In certain embodiments, because the request filter module 202 intercepts a network request to prevent the network request from entering the data network 114 and the local response module 206 satisfies the intercepted network request exclusive of the data network 114, no traffic enters the data network 114 as a result of a network request for which a matching entry exists in the shared response cache 112.

Figure 3:
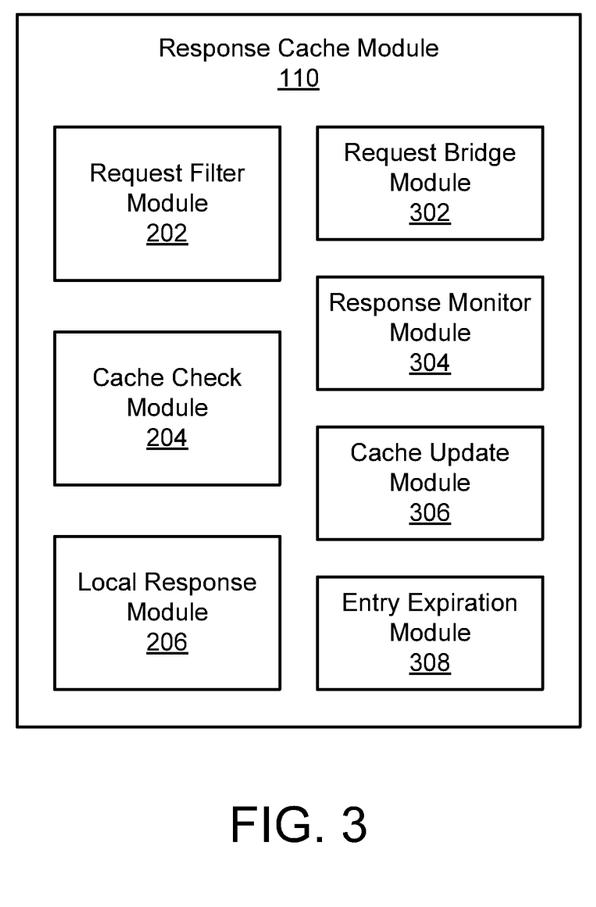
FIG. 3 is a schematic block diagram illustrating another embodiment of a response cache module in accordance with the present invention.

FIG. 3 depicts another embodiment of the response cache module 110. In the depicted embodiment, the response cache module 110 includes the request filter module 202, the cache check module 204, and the local response module 206, and further includes a request bridge module 302, a response monitor module 304, a cache update module 306, and an entry expiration module 308. The response cache module 110 of FIG. 3, in certain embodiments, may be substantially similar to the response cache modules 110 described above with regard to FIGS. 1A, 1B, and 2.

In one embodiment, the request bridge module 302 bridges network requests from the clients 104 to the data network 114. The request bridge module 302, in a further embodiment, bridges a network request to one or more intended recipients 116 of the network request on the data network 114 in response to the shared response cache 112 failing to have an entry matching the network request. For example, if the cache check module 204 determines that the shared response cache 112 does not have an entry matching an intercepted network request, in one embodiment, instead of the local response module 206 sending a response to the requesting client, the request bridge module 302 bridges the intercepted network request to the data network 114 so that a recipient 116 may respond to the bridged network request.

In one embodiment, the response monitor module 304 monitors communications from the recipients 116 on the data network 114, to observe network responses from the recipients 116 to network requests that the request bridge module 302 bridges to the data network 114. The response monitor module 304, in certain embodiments, observes network responses from the recipients 116 on the data network 114 unobtrusively, without altering the network responses, so that the observation of the response monitor module 304 is transparent to the receiving client 104. For example, in various embodiments, the response monitor module 304 may copy a response to observe it, intercept a response to observe it and forward the response to a client 104, scan a response as it passes through the network bridge 108, or the like.

The response monitor module 304, the request bridge module 302, or the like, in certain embodiments, maintain a list of network requests that the request bridge module 302 has bridged to the data network 114, and the response monitor module 304 filters communications from the data network 114 to observe responses to network requests from the list. The response monitor module 304 may filter by response type, by an address of the recipient 116 that sent the response, and/or by another response identifier to determine whether a network communication is a response to a bridged network request. For example, in embodiments where the request filter module 202 intercepts ARP requests or the like, the response monitor module 304 may filter ARP responses corresponding to ARP requests that the request bridge module 302 has bridged to the data network 114.

In one embodiment, the cache update module 306 populates the shared response cache 112 with an entry matching a network request based on information from an observed network response to the network request. The response monitor module 304 may send observed network responses to the cache update module 306 to parse and extract information, the response monitor module 304 may parse observed network responses and extract information from the network responses to provide to the cache update module 306, or the response monitor module 304 and the cache update module 306 may otherwise cooperate to extract information from observed network responses.

The cache update module 306, in one embodiment, populates the shared response cache 112 with enough information for the cache check module 204 to match entries in the shared response cache 112 with subsequent network requests and for the local response module 206 to form network responses based on the entries. The cache update module 306 may store entire network responses in the shared response cache 112 or may store extracted information from network responses in the shared response cache 112. For example, in one embodiment, the cache update module 306 populates an ARP shared response cache 112 with a MAC address and an IP address from an observed ARP response. Once the cache update module 306 has populated the shared response cache 112 with an entry matching an observed network response, the cache check module 204 may match subsequently intercepted network requests to the entry.

In one embodiment, the entry expiration module 308 expires an entry from the shared response cache 112 in response to an expiration event for the entry. In various embodiments, an expiration event may include an expiration period for an entry running out, the request filter module 202 intercepting a predefined number of matching requests for an entry, reaching a predefined expiration time for an entry, or the like.

The cache update module 306, in one embodiment, stores a definition of an expiration event with each entry in the shared response cache 112. For example, each entry may include an entry state, such as permanent, noarp, reachable, stale, delay, probe, incomplete, failed, or the like relating to expiration of the corresponding entry. In another embodiment, the entry expiration module 308 may enforce a uniform expiration policy for entries in the shared response cache 112. Expiration policies and/or expiration event definitions, in various embodiments, may be defaults, may be custom defined by a user, may be based on a history of network requests, or the like.

In one embodiment, the request bridge module 302 bridges a subsequent network request to one or more recipients 116 once the entry expiration module 308 has expired a matching entry from the shared response cache 112, the response monitor module 304 observes a response to the subsequent network request, and the cache update module 306 re-populates the shared response cache 112 with a subsequent entry matching the subsequent network request. In certain embodiments, the entry expiration module 308 ensures that entries in the shared response cache 112 remain accurate and up to date by periodically expiring entries from the shared response cache 112.

Figure 4:
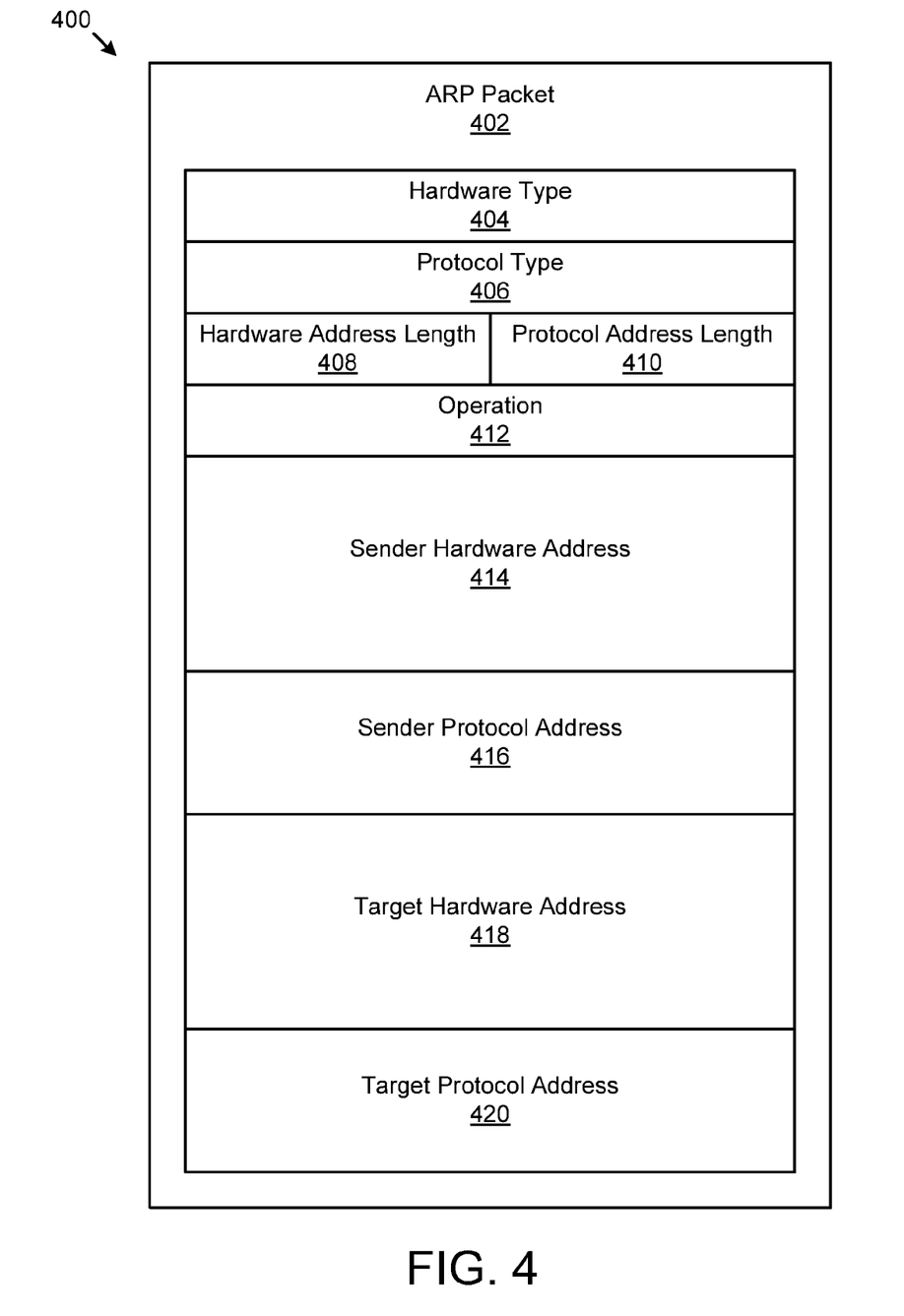
FIG. 4 is a schematic block diagram illustrating one embodiment of a network communication in accordance with the present invention.

FIG. 4 depicts one embodiment of a network communication 400. In the depicted embodiment, the network communication 400 includes an ARP packet 402. The ARP packet 402, as depicted, includes a hardware type 404, a protocol type 406, a hardware address length 408, a protocol address length 410, an operation code 412, a sender hardware address 414, a sender protocol address 416, a target hardware address 418, and a target protocol address 420. In one embodiment, the ARP packet 402 may be a network request or a network response, depending on the value of the operation code 412, as described below.

In one embodiment, the hardware type 404 specifies a link layer protocol type for the network communication 400, such as Ethernet, Token Ring, IEEE 802, ARCNET, frame relay, asynchronous transfer mode ("ATM"), high-level data link control ("HDLC"), fibre channel, serial line, IEEE 1394 ("Firewire"), IPsec tunnel, InfiniBand, or the like. The protocol type 406, in one embodiment, specifies an upper layer protocol for which the ARP packet 402 is intended, such as IPv4 or another defined member of the Ethertype namespace, or the like.

In one embodiment, the hardware address length 408 defines a length of the hardware addresses 414, 418, in bytes or the like. A MAC address for Ethernet or other IEEE 802 networks, the hardware address length 408 is typically 6 bytes. The protocol address length 410, in one embodiment, defines a length of the protocol addresses 416, 420 used in the upper layer protocol defined by the protocol type 406, in bytes or the like. For IPv4 addresses, the protocol address length 410 is typically 4 bytes.

In one embodiment, the operation code 412 specifies whether the network communication 400 is a network request, a network reply, or another type of message, so that a similar format for the network communication 400 may be used for both network requests and replies. For example, the operation code 412 may specify that the network communication 400 is an ARP request, an ARP reply, a reverse ARP ("RARP") request, a RARP reply, a dynamic RARP ("DRARP") request, a DRARP reply, a DRARP error, an inverse ARP ("InARP") request, an InARP reply, or the like.

The sender hardware address 414, in one embodiment, specifies the hardware address, such as a MAC address, of the sender, such as a client 104, a recipient 116, or the like. For ARP request packets 402 that a client 104 sends, the sender hardware address 414 typically includes the hardware address of the sending client 104. For ARP response packets 402 that a recipient 116 sends, the sender hardware address 414 typically includes the hardware address of the sending recipient 116. In one embodiment, the sender protocol address 416 specifies the upper layer protocol address, such as an IP address, of the sender, such as a client 104, a recipient 116, or the like.

In one embodiment, the target hardware address 418 specifies a hardware address, such as a MAC address, of the intended recipient 104, 116 of the network communication 400. The target hardware address 418, in certain embodiments, is ignored for network requests, as the requesting client 104 does not know the target hardware address 418 and is requesting it. In one embodiment, the target protocol address 420 specifies an upper layer protocol address, such as an IP address, of the intended recipient 104, 116 of the network communication 400.

In certain embodiments, the request filter module 202 filters and intercepts network communications 400 based values of one or more fields of the network communication 400. For example, the request filter module 202 may select which network communications 400 to intercept based on values of the operation code 412, the sender hardware address 414, the sender protocol address 416, and/or other fields of the network communication 400.

The cache check module 204, in one embodiment, uses the values of one or more fields of the network communication 400 to determine whether or not the shared response cache 112 includes an entry matching an intercepted network request. For example, the cache check module 204 may check the shared response cache 112 for an entry including the target protocol address 420 of an intercepted network request, or the like. The local response module 206, in one embodiment, sends an ARP response packet 402 to a requesting client 104 with a protocol address from the shared response cache 112 as the sender protocol address 416 and a corresponding hardware address from the shared response cache 112 as the sender hardware address 414.

The cache update module 306, in certain embodiments, populates the shared response cache 112 with an entry based on values of one or more fields of an observed network communication 400. For example, the cache update module 306 may add an entry including the sender hardware address 414 and the sender protocol address 416 of an observed ARP response packet 402 from a recipient 116 on the data network 114, or the like.

Figure 5:
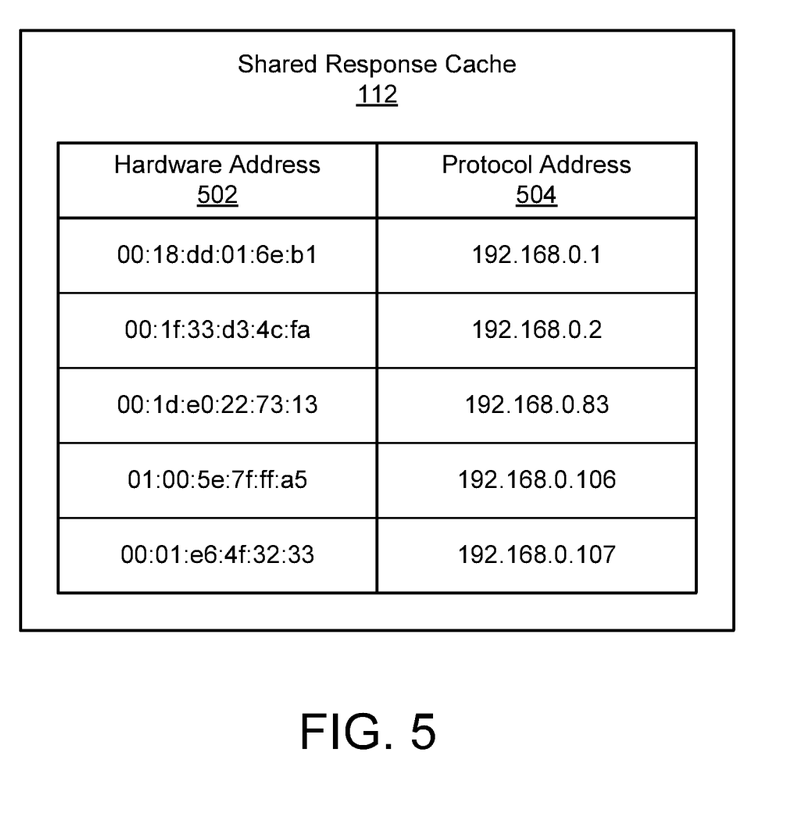
FIG. 5 is a schematic block diagram illustrating one embodiment of a shared response cache in accordance with the present invention.

FIG. 5 depicts one embodiment of the shared response cache 112. In the depicted embodiment, the shared response cache 112 is an address resolution cache, such as an ARP cache, an NDP cache, or the like that includes a set of hardware addresses 502 and a corresponding set of protocol addresses 504. In other embodiments, the shared response cache 112 may include expiration metadata such as an entry state and/or other entry metadata.

In the depicted embodiment, the hardware addresses 502 include MAC addresses that are typically used with Ethernet and IEEE 802 type network adapters. In other embodiments, the hardware addresses 502 may include other types of hardware addresses. The protocol addresses 504, in the depicted embodiment, include IPv4 addresses. In other embodiments, the protocol addresses 504 may include IPv6 addresses or another type of protocol address.

The cache check module 204, in one embodiment, extracts the target protocol address 420 from an intercepted ARP, NDP, or other address resolution request packet and checks the protocol addresses 504 of the shared response cache 112 to determine whether one of the cached protocol addresses 504 matches the intercepted target protocol address 420. If one of the cached protocol addresses 504 matches the intercepted target protocol address 420, the local response module 206, in one embodiment, sends an address resolution response packet to the requesting client 104, with the matching protocol address 504 as the sender protocol address 416 and the corresponding hardware address 502 as the sender hardware address 414 in the address resolution response packet.

If the shared response cache 112 does not include an entry matching the intercepted target protocol address 420, in certain embodiments, the request bridge module 302 bridges the intercepted address resolution request packet to the data network 114. The response monitor module 304 observes an address resolution response packet from a recipient 116. The cache update module 306 adds an entry to the shared response cache 112 with the sender hardware address 414 from the address resolution response packet as the hardware address 502 for the entry and the sender protocol address 416 from the address resolution response packet as the protocol address 504 for the entry.

Figure 6:
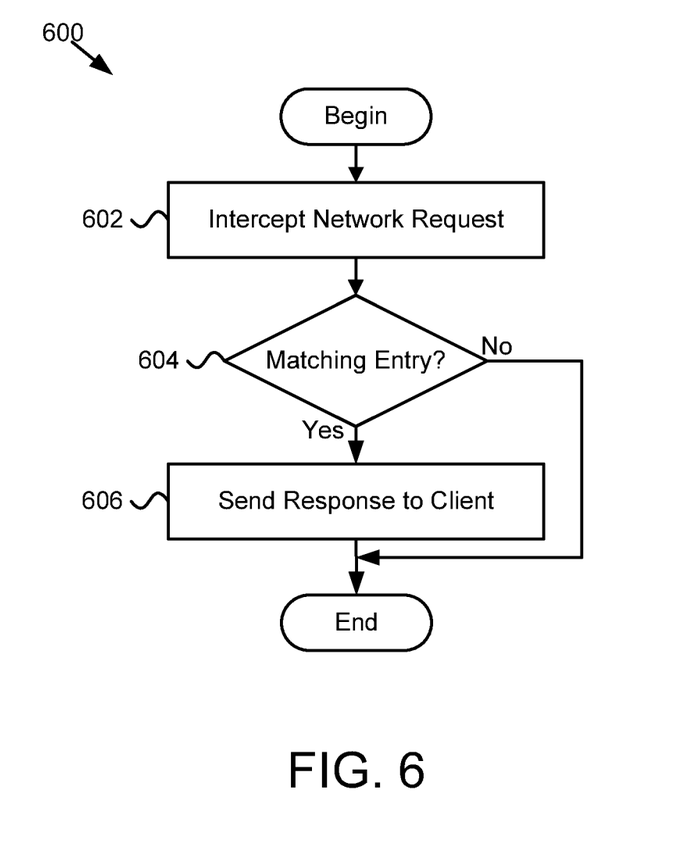
FIG. 6 is a schematic flow chart diagram illustrating one embodiment of a method for reducing network traffic in accordance with the present invention.

FIG. 6 depicts one embodiment of a method 600 for reducing network traffic. The method 600 begins and the request filter module 202 intercepts 602 a network request from a client 104. In one embodiment, intercepting 602 the network request prevents the network request from entering a data network 114 and reaching one or more intended recipients 116 of the network request.

The cache check module 204 determines 604 whether a shared response cache 112 includes an entry matching the network request. If the cache check module 204 determines 604 that the shared response cache 112 includes an entry matching the network request, the local response module 206 sends 606 a local response to the requesting client 104 and the method ends. In one embodiment, the local response module 206 bases the local response on information from the matching entry in the shared response cache 112 so that the local response satisfies the network request. If the cache check module 204 determines 604 that the shared response cache 112 does not include an entry matching the network request, the method 600 ends.

Figure 7:
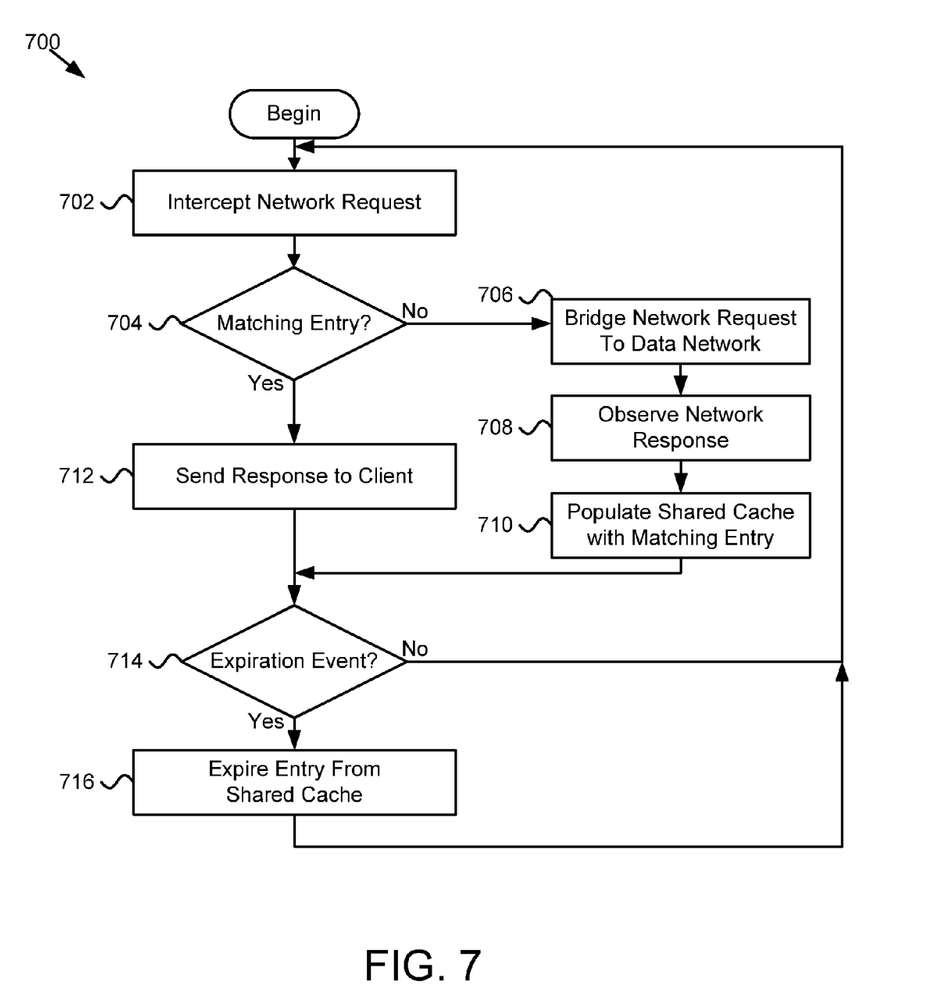
FIG. 7 is a schematic flow chart diagram illustrating another embodiment of a method for reducing network traffic in accordance with the present invention.

FIG. 7 depicts another embodiment of a method 700 for reducing network traffic. The method 700 begins and the request filter module 202 intercepts 702 a network request from a client 104, preventing the network request from entering a data network 114 and reaching one or more intended recipients 116 of the network request.

The cache check module 204 determines 704 whether a shared response cache 112 includes an entry matching the network request. If the cache check module 204 determines 704 that the shared response cache 112 includes an entry matching the network request, the local response module 206 sends 712 a local response to the requesting client 104 based on information from the matching entry in the shared response cache 112 so that the local response satisfies the network request.

If the cache check module 204 determines 704 that the shared response cache 112 does not include an entry matching the network request, in the depicted embodiment, the request bridge module 302 bridges 706 the network request to the data network 114. The response monitor module 708 observes 708 a network response that a recipient 116 sent to the requesting client 104 in response to the bridged network request. The cache update module 306 populates 710 the shared response cache 112 with an entry matching the network request based on information from the network response.

The entry expiration module 308, in the depicted embodiment, determines 714 whether an expiration event for an entry in the shared response cache 112 has occurred. If the entry expiration module 308 determines 714 that an expiration event for an entry has occurred, the entry expiration module 308 expires 716 the entry from the shared response cache 112 and the method 700 continues, with the request filter module 202 monitoring and intercepting 702 subsequent network requests. If the entry expiration module 308 determines 714 that no expiration event has occurred, the method 700 also continues, with the request filter module 202 monitoring and intercepting 702 subsequent network requests.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a request filter module that intercepts a network request to prevent the network request from entering a data network, the network request sent by a client and intended for one or more recipients on the data network;
   a cache check module that checks a shared response cache for an entry matching the network request;
   a local response module that sends a local response to the client in response to an entry in the shared response cache matching the network request the local response to the client being non-maliciously spoofed such that the local response is formatted to appear to the client to be from a matching recipient of the one or more recipients on the data network, the matching recipient identified based on information from the matching entry in the shared response cache;
   a request bridge module that
      bridges the network request to the one or more recipients in response to the shared response cache failing to have an entry matching the network request; and
      maintains a list of bridged network requests at the virtual bridge such that a response received from the one or more recipients is observed in response to the received response corresponding to a bridged network request on the list,
   a response monitor module that observes a network response to the network request sent from one of the one or more recipients to the client;
   a cache update module that populates the shared response cache with an entry matching the network request based on information from the observed network response;
   a request bridge module that bridges a subsequent network request to the one or more recipients in response to the shared response cache failing to have the matching entry in response to expiring the matching entry from the shared response cache, the subsequent network request corresponding to the matching entry; and
   a cache update module that re-populates the shared response cache with a subsequent entry matching the subsequent network request based on an observed network response to the subsequent network request;
   wherein said modules comprise one or more of hardware circuits, a programmable hardware device and computer readable program code, wherein when said modules comprise computer readable code, the apparatus comprises a processor that executes the computer readable code.

2. The apparatus of claim 1, further comprising an entry expiration module that expires the matching entry from the shared response cache in response to an expiration event for the matching entry.

3. A system comprising:
   a client;
   a response cache module in communication with the client, the response cache module comprising,
      a request filter module that intercepts a network request at a virtual network bridge to prevent the network request from entering a data network, the network request sent by the client and intended for one or more recipients on the data network, the client comprising a virtual machine executing on a computer device, the virtual network bridge associated with the virtual machine;
      a cache check module that checks a shared response cache for an entry matching the network request; and a local response module that sends a local response to the client in response to an entry in the shared response cache matching the network request, the local response to the client being non-maliciously spoofed such that the local response is formatted to appear to the client to be from a matching recipient of the one or more recipients on the data network, the matching recipient identified based on information from the matching entry in the shared response cache;

a request bridge module that
  bridges the network request to the one or more recipients in response to the shared response cache failing to have an entry matching the network request; and
  maintains a list of bridged network requests at the virtual bridge such that a response received from the one or more recipients is observed in response to the received response corresponding to a bridged network request on the list, a response monitor module that observes a network response to the network request sent from one of the one or more recipients to the client;

a cache update module that populates the shared response cache with an entry matching the network request based on information from the observed network response;

a request bridge module that bridges a subsequent network request to the one or more recipients in response to the shared response cache failing to have the matching entry in response to expiring the matching entry from the shared response cache, the subsequent network request corresponding to the matching entry; and a cache update module that re-populates the shared response cache with a subsequent entry matching the subsequent network request based on an observed network response to the subsequent network request;

wherein said modules comprise one or more of hardware circuits, a programmable hardware device and computer readable program code, wherein when said modules comprise computer readable code, the system comprises a processor that executes the computer readable code.

4. The system of claim 3, further comprising a network bridge associated with the client, the network bridge comprising the response cache module.

5. The system of claim 4, further comprising a plurality of virtual machines associated with the network bridge, wherein the virtual machine of the client comprises a virtual machine of the plurality of virtual machines, the request filter module intercepting network requests from the plurality of virtual machines.

6. The system of claim 5, further comprising a hypervisor managing the plurality of virtual machines, the network bridge comprising a virtual network bridge integrated with the hypervisor.

7. The system of claim 5, further comprising the computer device, the plurality of virtual machines executing on the computer device, the computer device comprising the network bridge.

8. A computer program product comprising a non-transitory computer readable storage medium having program instructions embodied therewith, the program instructions executable by a processor to cause the processor to:
  intercept a network request to prevent the network request from entering a data network, the network request sent by a client and intended for one or more recipients on the data network;
  check a shared response cache for an entry matching the network request;
  send a local response to the client in response to an entry in the shared response cache matching the network request, the local response to the client being non-maliciously spoofed such that the local response is formatted to appear to the client to be from a matching recipient of the one or more recipients on the data network, the matching recipient identified based on information from the matching entry in the shared response cache;
  bridge the network request to the one or more recipients in response to the shared response cache failing to have an entry matching the network request;
  maintain a list of bridged network requests at the virtual bridge such that a response received from the one or more recipients is observed in response to the received response corresponding to a bridged network request on the list;
  observe a network response to the network request sent from one of the one or more recipients to the client;
  populate the shared response cache with an entry matching the network request based on information from the observed network response;
  bridge a subsequent network request to the one or more recipients in response to the shared response cache failing to have the matching entry in response to expiring the matching entry from the shared response cache, the subsequent network request corresponding to the matching entry; and
  re-populate the shared response cache with a subsequent entry matching the subsequent network request based on an observed network response to the subsequent network request.

9. The computer program product of claim 8, the program instructions further causing the processor to expire the matching entry from the shared response cache in response to an expiration event for the matching entry.

* * * * *